US011226315B2

(12) United States Patent
Ashrafi (10) Patent No.: US 11,226,315 B2
(45) Date of Patent: Jan. 18, 2022

(54) PASSIVE NOISE-CANCELLATION FOR ULTRASONIC EVALUATION

(71) Applicant: The Boeing Company, Chicago, IL (US)

(72) Inventor: Mahdi Ashrafi, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 129 days.

(21) Appl. No.: 16/379,040

(22) Filed: Apr. 9, 2019

(65) Prior Publication Data

US 2020/0326314 A1  Oct. 15, 2020

(51) Int. Cl.
*G01N 29/44* (2006.01)
*G01N 29/32* (2006.01)

(52) U.S. Cl.
CPC ......... *G01N 29/4463* (2013.01); *G01N 29/32* (2013.01); *G01N 29/4454* (2013.01)

(58) Field of Classification Search
CPC ............... G01N 29/4463; G01N 29/32; G01N 29/4454; G01N 29/043; G01N 29/46; G01N 29/4418; G01N 29/041; G01N 29/4436
See application file for complete search history.

(56) References Cited

U.S. PATENT DOCUMENTS

| 4,893,286 | A * | 1/1990 | Cobb | G01S 15/06 367/87 |
| 9,046,402 | B2 * | 6/2015 | Ferren | G01F 23/296 |
| 9,964,430 | B2 * | 5/2018 | Hedin | G01H 1/003 |
| 2003/0187354 | A1 * | 10/2003 | Rust | A61B 8/00 600/437 |
| 2007/0154049 | A1 | 7/2007 | Levitsky et al. | |
| 2009/0136104 | A1 | 5/2009 | Hajian et al. | |
| 2014/0074410 | A1 * | 3/2014 | Glavicic | G01N 29/043 702/39 |
| 2014/0216158 | A1 * | 8/2014 | Martin | G01N 29/06 73/588 |
| 2016/0341814 | A1 * | 11/2016 | Nguyen | G01S 7/023 |
| 2016/0363562 | A1 * | 12/2016 | Takahashi | G01N 29/46 |
| 2017/0153346 | A1 * | 6/2017 | Biswas | G01V 1/48 |
| 2018/0005643 | A1 * | 1/2018 | Tsingos | G10K 11/175 |

OTHER PUBLICATIONS

Honarvar, F. et al., "Improving the time-resolution and signal-to-noise ratio of ultrasonic NDE signals", Ultrasonics 41, Jan. 1, 2004, pp. 755-763, Elsevier.
Matz, V. et al., "Signal-to-noise ratio enhancement based on wavelet filtering in ultrasonic testing", Ultrasonics 49, Jun. 6, 2009, pp. 752-759, Elsevier.

* cited by examiner

*Primary Examiner* — Helen C Kwok
(74) *Attorney, Agent, or Firm* — Coats & Bennett, PLLC (57) ABSTRACT

Noise present in ultrasonic tests applied by an ultrasonic test system to test objects, e.g., production parts, is reduced to provide more accurate results and to reduce waste, e.g., by reducing the number of test objects inaccurately identified as faulty. To that end, a noise signature is obtained for an ultrasonic test applied by the ultrasonic test system to a known object having the same dimensions and the same material composition as the test objects. The noise present in the output of the ultrasonic test applied by the ultrasonic test system to one or more of the test objects is then reduced responsive to the obtained noise signature to improve the accuracy of the ultrasonic test.

20 Claims, 8 Drawing Sheets

PASSIVE NOISE-CANCELLATION FOR ULTRASONIC EVALUATION

TECHNOLOGICAL FIELD

The present disclosure relates generally to the field of Non-Destructive Evaluation (NDE) and/or Non-Destructive Inspection (NDI). More specifically the present disclosure relates to the field of Ultrasonic Test (UT) inspection.

BACKGROUND

Ultrasonic tests non-destructively evaluate a wide variety of parts, materials, and/or structures for flaws that are not visible from the outside. Because such flaws could ultimately compromise the integrity of the object under test, such ultrasonic tests are regularly employed to monitor the safety of various structures, e.g., bridges, buildings, etc., and/or to evaluate the integrity of parts used to build various structures, e.g., airplanes, cars, boats, etc.

Ultrasonic tests are susceptible to noise, which degrades the quality and accuracy of the ultrasonic test results. Such inaccuracies may cause acceptable parts to be rejected, and/or may cause stable structures to be marked as unsafe and/or may increase the test time (e.g., due to the need to repeat tests). As such, noise may have expensive consequences. Thus, it is desirable to reduce the presence of noise in ultrasonic test results.

SUMMARY

According to aspects of the present disclosure, apparatuses, systems, and methods are presented for reducing noise present in ultrasonic tests applied by an ultrasonic test system to test objects, e.g., production parts. By reducing the noise, the solution presented herein provides more accurate results and reduces waste by reducing the number of test objects inaccurately identified as faulty.

The present disclosure discloses a method of improving an accuracy of an ultrasonic test applied by an ultrasonic test system to test objects, where each test object has the same material composition and the same dimensions. The method comprises obtaining a noise signature for an ultrasonic test applied by the ultrasonic test system to a known object having the same dimensions and the same material composition as the test objects. The method further comprises reducing noise in an output of the ultrasonic test applied by the ultrasonic test system to one or more of the test objects responsive to the noise signature to improve the accuracy of the ultrasonic test.

According to a further aspect, obtaining the noise signature comprises performing a qualification test on the known object using the ultrasonic test system to generate a qualification output waveform, where the qualification test has an expected output waveform for the known object, and obtaining the noise signature by extracting the noise signature from the qualification output waveform using the expected output waveform.

According to a further aspect, performing the qualification test on the known object comprises performing multiple qualification tests on the known object using the ultrasonic test system to generate the qualification output waveform for each of the multiple qualification tests, and averaging two or more of the qualification output waveforms to generate an average qualification output waveform. According to this further aspect, extracting the noise signature comprises extracting the noise signature from the average qualification output waveform using the expected output waveform.

According to a further aspect, performing the qualification test on the known object comprises performing multiple qualification tests on the known object using the ultrasonic test system to generate the qualification output waveform for each of the multiple qualification tests. According to this further aspect, extracting the noise signature comprises extracting a preliminary noise signature from each of two or more of the qualification output waveforms using the expected output waveform and averaging the preliminary noise signatures to generate the noise signature.

According to a further aspect, reducing the noise comprises pre-processing an input test signal for the ultrasonic test system to generate a noise-cancellation input test signal for application by the ultrasonic test system to one or more of the test objects.

According to a further aspect, pre-processing the input test signal comprises applying a reciprocal of the noise signature to the input test signal to generate the noise-cancellation input test signal.

According to a further aspect, pre-processing the input test signal comprises subtracting the noise signature from the input test signal to generate the noise-cancellation input test signal.

According to a further aspect, reducing the noise comprises post-processing a test output waveform output by the ultrasonic test system for a corresponding one of the test objects using the noise signature to generate a noise-reduced output waveform for the corresponding one of the test objects.

According to a further aspect, post-processing the test output waveform comprises applying a reciprocal of the noise signature to the test output waveform to generate the noise-reduced output waveform.

According to a further aspect, post-processing the test output waveform comprises subtracting the noise signature from the test output waveform to generate the noise-reduced output waveform.

The present disclosure also discloses an ultrasonic test system operable to improve an accuracy of an ultrasonic test applied by the ultrasonic test system to one or more test objects, where each test object has the same material composition and the same dimensions. The ultrasonic test system comprising one or more processing circuits and a noise-reduction circuit. The one or more processing circuits are operable to obtain a noise signature for an ultrasonic test applied by the ultrasonic test system to a known object having the same dimensions and the same material composition as the test objects. The noise-reduction circuit is operable to reduce noise in an output of an ultrasonic test applied by the ultrasonic test system to one or more of the test objects responsive to the noise signature to improve the accuracy of the ultrasonic test.

According to a further aspect, the one or more processing circuits obtain the noise signature by performing a qualification test on the known object using the ultrasonic test system to generate a qualification output waveform, where the qualification test has an expected output waveform for the known object, and by obtaining the noise signature by extracting the noise signature from the qualification output waveform using the expected output waveform.

According to a further aspect, the one or more processing circuits perform the qualification test on the known object by performing multiple qualification tests on the known object using the ultrasonic test system to generate the qualification output waveform for each of the multiple qualification tests, and averaging two or more of the qualification output waveforms to generate an average qualification output waveform. The one or more processing circuits perform then obtain the noise signature by extracting the noise signature from the average qualification output waveform using the expected output waveform.

According to a further aspect, the one or more processing circuits perform the qualification test on the known object by performing multiple qualification tests on the known object using the ultrasonic test system to generate the qualification output waveform for each of the multiple qualification tests. The one or more processing circuits obtain the noise signature by extracting a preliminary noise signature from each of two or more of the qualification output waveforms using the expected output waveform, and averaging the preliminary noise signatures to generate the noise signature.

According to a further aspect, the noise-reduction circuit reduces the noise by pre-processing an input test signal for the ultrasonic test system to generate a noise-cancellation input test signal for application by the ultrasonic test system to one or more of the test objects.

According to a further aspect, the noise-reduction circuit pre-processes the input test signal by applying a reciprocal of the noise signature to the input test signal to generate the noise-cancellation input test signal.

According to a further aspect, the noise-reduction circuit pre-processes the input test signal by subtracting the noise signature from the input test signal to generate the noise-cancellation input test signal.

According to a further aspect, the noise-reduction circuit reduces the noise by post-processing a test output waveform output by the ultrasonic test system for a corresponding one of the test objects using the noise signature to generate a noise-reduced output signal for the corresponding one of the test objects.

According to a further aspect, the noise-reduction circuit post-processes the test output waveform by applying a reciprocal of the noise signature to the test output waveform to generate the noise-reduced output signal.

According to a further aspect, the noise-reduction circuit post-processes the test output waveform by subtracting the noise signature from the test output waveform to generate the noise-reduced output signal.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

Figure 1:
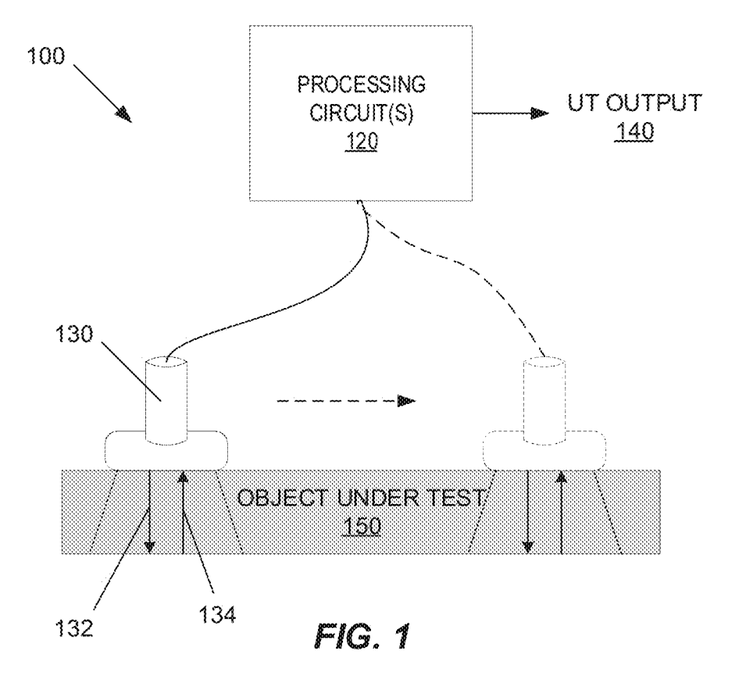
FIG. 1 shows a generic block diagram of an exemplary ultrasonic test system.

FIG. 1 shows the general operation of an ultrasonic test system 100 when used to test an object under test 150 for defects. The ultrasonic test system 100 comprises one or more processing circuits 120 and a test probe 130 operatively connected to the processing circuit(s) 120. The processing circuit(s) 120 apply an ultrasonic input signal 132 to the object under test 150 via the test probe 130, and the test probe 130 receives a reflection signal 134 in response. The reflection signal 134 represents the response of the object under test 150 to the ultrasonic test, and varies depending on whether the ultrasonic input signal 132 is impeded, e.g., by a defect, or is not impeded as it passes through and is reflected by, the object under test 150. During the ultrasonic test, the test probe 130 may move along the surface of the object under test 150 while the test probe 130 applies the ultrasonic input signal 132 and receives the resulting reflection signals 134. Alternatively, for each of multiple test locations on the object under test 150, the test probe 130 may stay stationary while the test probe 130 applies the ultrasonic input signal 132 and receives the resulting reflection signal 134. The processing circuit(s) 120 apply signal processing to the received reflection signals 134 to generate an ultrasonic output 140 for the object under test 150.

Ultrasonic testing is susceptible to noise, e.g., caused by ambient lower frequencies generally caused by characteristics of the material of the object under test 150 and/or ambient equipment noise. For example, reflections of ultrasonic waves from grain boundaries and/or microscopic reflectors in the material may cause spatially random signals, i.e., noise, to be present in the ultrasonic output 140. Further, the processing circuit(s) 120 and/or other electronics equipment proximate the ultrasonic test site and/or system 100 emit vibrations and/or electromagnetic signals, which may be detected by the test probe 130, and thus may contribute to the noise present in the ultrasonic output 140. The presence of any one or more of these different types of noise reduces the signal-to-noise ratio of the ultrasonic output 140, which reduces the accuracy and/or reliability of the ultrasonic test.

Conventional solutions for addressing noise include the processing circuit(s) 120 filtering out the noise, averaging out the noise, controlling an initial pulse shape to account for the noise, etc. Further, appropriately placed shielding and grounding may help block or reduce ambient equipment noise caused by the electromagnetic environment proximate the ultrasonic test, e.g., caused by the ultrasonic test equipment and/or other electronics equipment proximate the ultrasonic test site and/or system 100. While the signal processing techniques may reduce the noise, they often also reduce the "desired" signal level, and thus do not provide sufficient improvement to the signal-to-noise ratio. Further, none of the conventional techniques sufficiently address, or are customized for, the ambient noise caused by the material itself.

Figure 2:
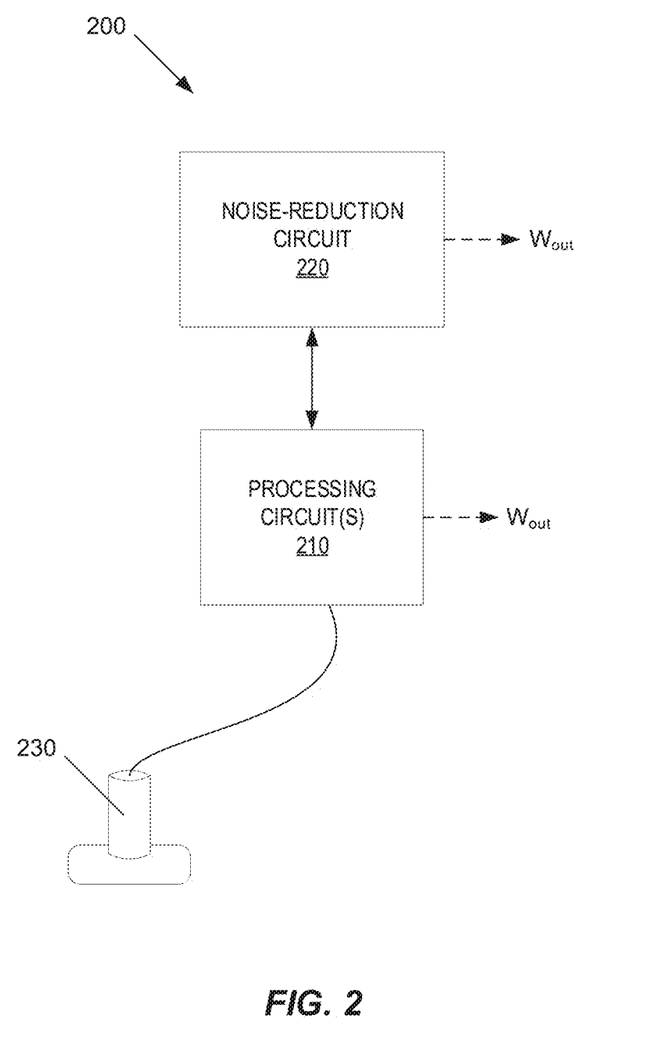
FIG. 2 shows a block diagram of an ultrasonic test system according to exemplary aspects disclosed herein.

FIG. 2 shows a noise-reduction ultrasonic test system 200 according to aspects disclosed herein. Noise-reduction ultrasonic test system 200 comprises one or more processing circuit(s) 210, a noise-reduction circuit 220, and a test probe 230. While FIG. 2 shows test probe 230 as being connected to the processing circuit(s) 210 via a cable, it will be appreciated that test probe 230 may alternatively be connected to the processing circuit(s) 210 via a wireless connection.

Figure 3:
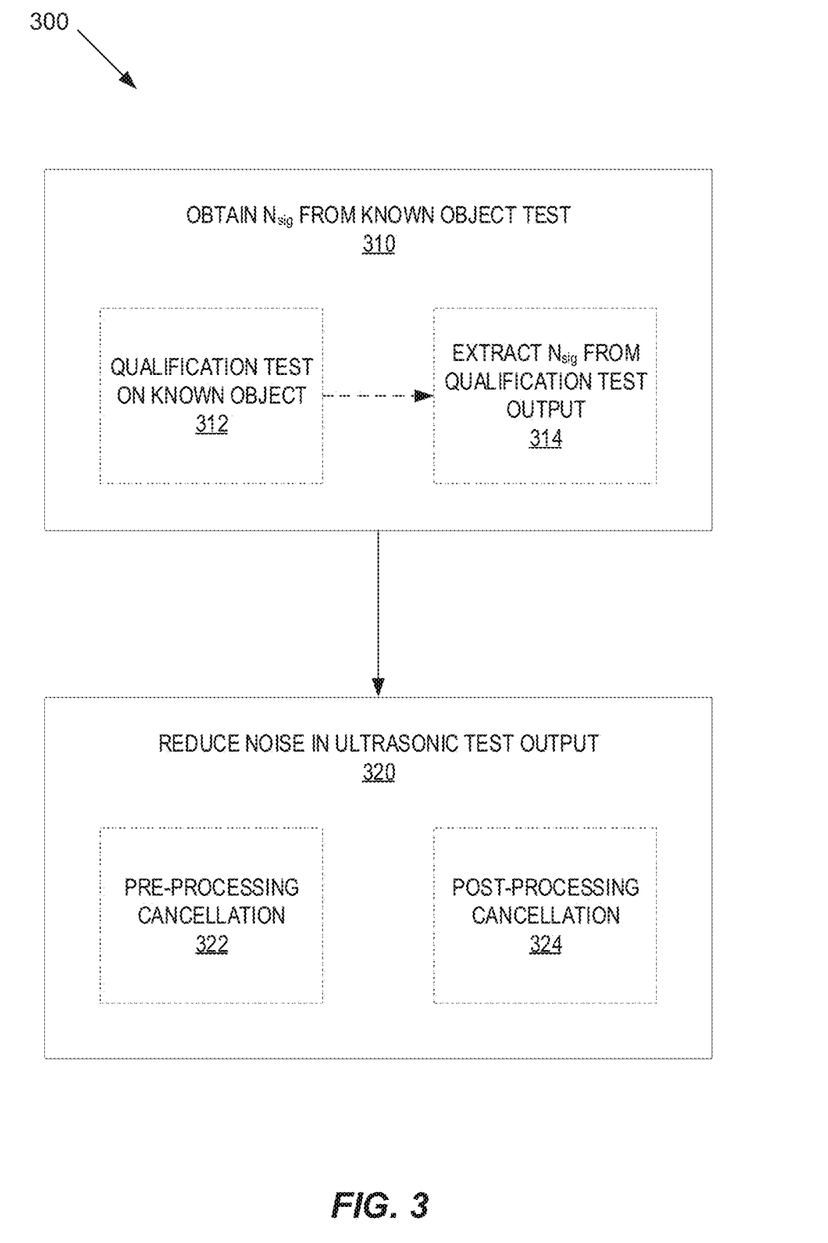
FIG. 3 shows an ultrasonic test method according to exemplary aspects disclosed herein.

FIG. 3 shows an exemplary noise-reduction method 300 as implemented by the noise-reduction ultrasonic test system 200 according to aspects disclosed herein. The processing circuit(s) 210 obtain the noise signature $N_{sig}$ for an ultrasonic test performed on a known object 152 (FIG. 4A), e.g., a Non-Destructive Inspection (NDI) detectability panel (block 310). The processing circuit(s) 210 and/or the noise-reduction circuit 220 use the obtained noise signature $N_{sig}$ to reduce the noise present in the output waveform $W_{out}$ (block 320) resulting from an ultrasonic test applied by the noise-reduction ultrasonic test system 200 to a test object 154 (FIG. 4B), e.g., a production part, where the test object 154 is made from the same material, i.e., has the same material composition, as the known object 152, and where the test object 154 has the same dimensions as the known object 152. By using the noise-reduction ultrasonic test system 200 and the same environment to perform ultrasonic testing on both the known object 152 and the test objects 154, the processing circuit(s) 210 are able to obtain an accurate estimate of a noise signature $N_{sig}$ that not only includes the ambient environmental noise, but also includes the material-specific and object-specific noise. Once the processing circuit(s) 210 obtain the noise signature $N_{sig}$, the processing circuit(s) 210 may store the noise signature $N_{sig}$ in memory (not shown). The processing circuit(s) 210 and/or noise-reduction circuit 220 may then retrieve the noise signature $N_{sig}$ from the memory whenever needed for future ultrasonic tests on the test objects 154.

Figure 4A:
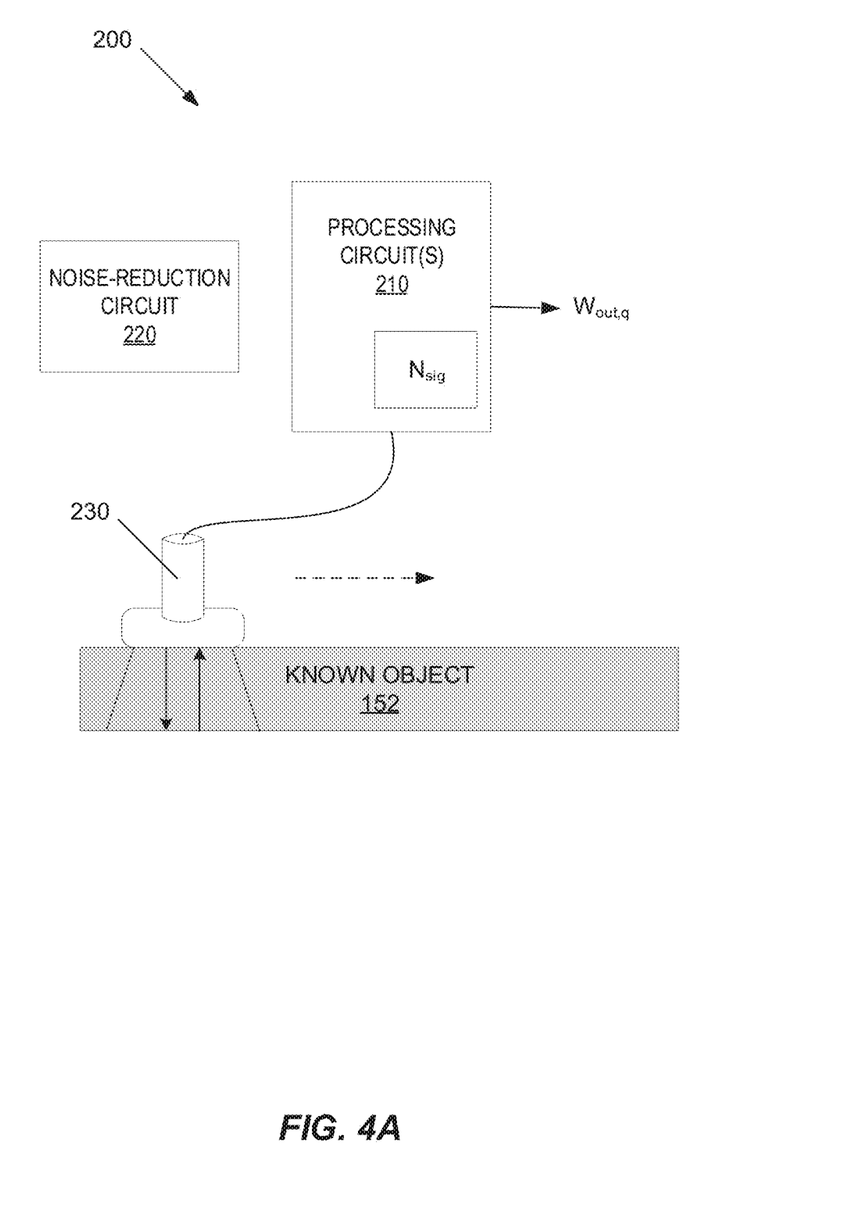
FIGS. 4A-4B show a block diagram of the ultrasonic test system according to exemplary aspects disclosed herein in operation.

FIG. 4A shows the noise-reduction ultrasonic test system 200 during qualification (block 310), which is when the noise-reduction ultrasonic test system 200 is evaluated to make sure it is operating within expected/required parameters. According to exemplary aspects, the processing circuit(s) 210 obtain the noise signature $N_{sig}$ using ultrasonic test results obtained from qualification. More particularly, the noise-reduction ultrasonic test system 200 executes an ultrasonic test on the known object 152 (block 312), where the known object 152 has the same dimensions and is made from the same material as the test objects 154 intended to be tested once the noise-reduction ultrasonic test system 200 passes qualification. The known object 152 has one or more known defects. Thus, qualification has an expected output waveform $W_{out,ex}$. The processing circuit(s) 210 use the qualification output waveform $W_{out,q}$ and the expected output waveform to extract the noise signature $N_{sig}$, e.g., $N_{sig} = W_{out,ex} - W_{out,q}$ (block 314).

Figure 4B:
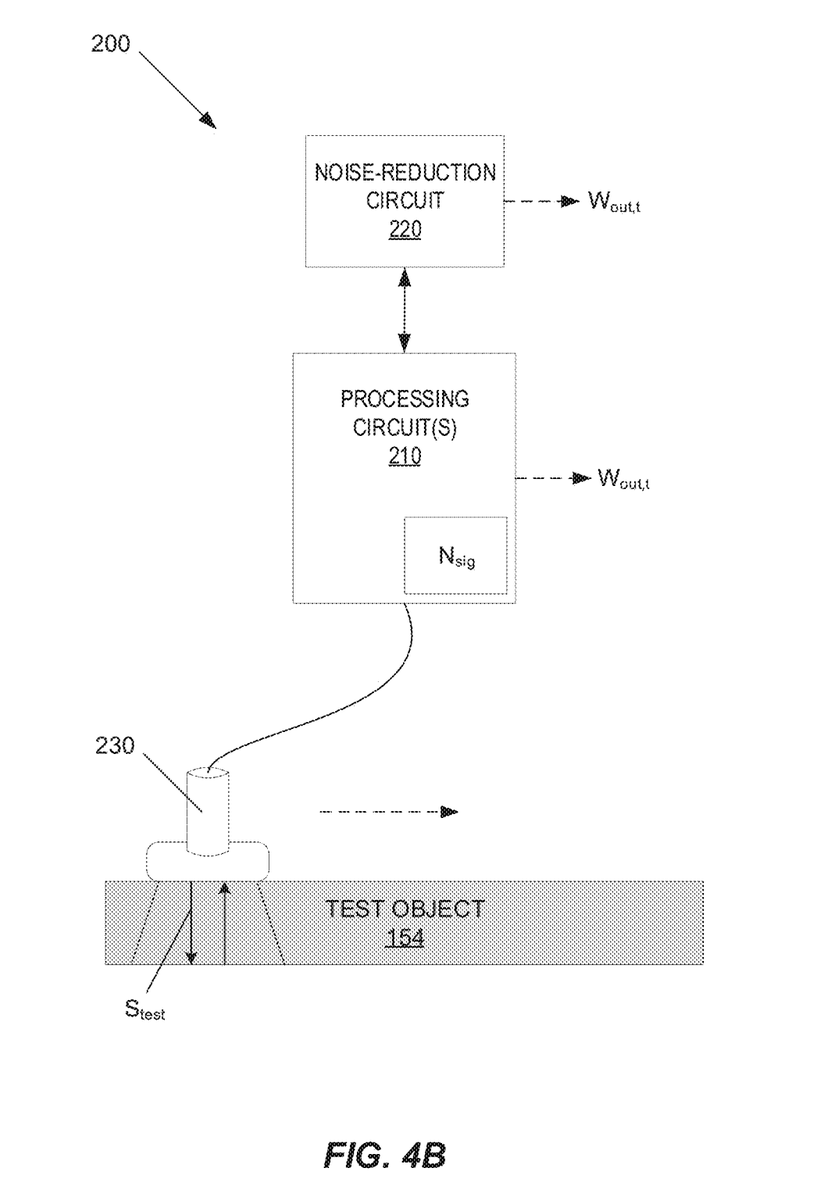

FIG. 4B shows the noise-reduction ultrasonic test system 200 when testing test objects 154 (block 320). The noise-reduction circuit 220 uses the noise signature $N_{sig}$ obtained from qualification results to reduce the noise present in the output waveform $W_{out,t}$ for the ultrasonic tests performed on the test objects 154, where each test object 154 has the same material composition and the same dimensions as the known object 152 used for qualification. In some aspects, the noise-reduction circuit 220 uses pre-processing cancellation to reduce the noise (block 322), while in other aspects, the noise-reduction circuit 220 uses post-processing cancellation to reduce the noise (block 324). For both the pre-processing and the post-processing cancellation techniques, the noise-reduction ultrasonic test system 200 reduces the noise present in the output waveform $W_{out,t}$ for each test object 154, and thus increases the associated signal-to-noise ratio. By improving the signal-to-noise ratio of $W_{out,t}$, the aspects disclosed herein improve the accuracy and the efficiency of the ultrasonic tests, and reduce waste typically caused by incorrect fault detection or the inability to clearly detect (or exclude) the presence of faults in the test objects 154.

Figure 5:
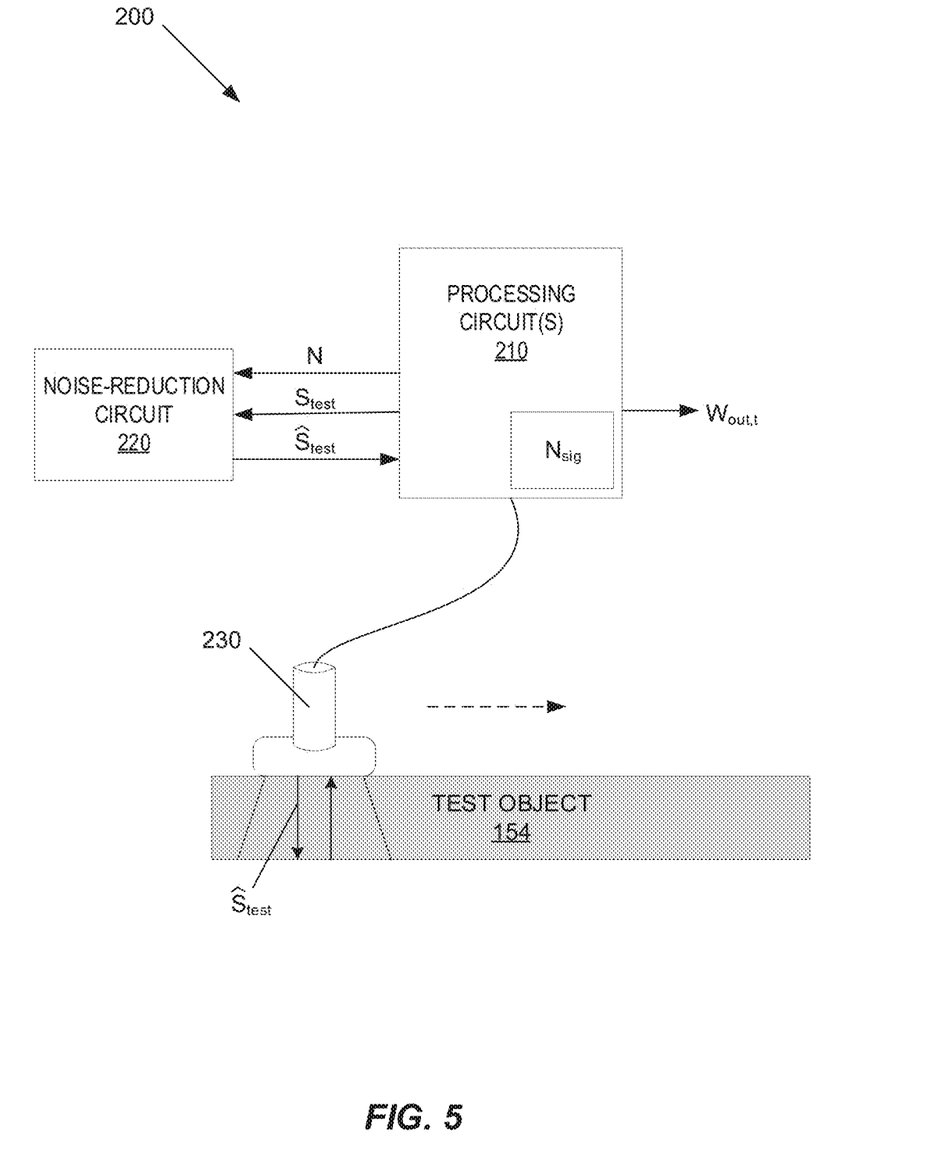
FIG. 5 shows a block diagram of an ultrasonic test system according to further exemplary aspects disclosed herein.

FIG. 5 shows an exemplary block diagram of the noise-reduction ultrasonic test system 200 when pre-processing noise-cancellation (block 322) is used to reduce the noise present in the output waveform $W_{out,t}$ for each test object 154. In this exemplary aspect, the processing circuit(s) 210 provide the noise signature $N_{sig}$ and the input ultrasonic test signal $S_{test}$ to the noise-reduction circuit 220. The noise-reduction circuit 220 pre-processes the input ultrasonic test signal $S_{test}$, using the noise signature $N_{sig}$, to generate a noise-cancellation input test signal $\hat{S}_{test}$. For example, the noise-reduction circuit 220 may multiply the input ultrasonic test signal $S_{test}$ by the inverse of the noise signature $N_{sig}$ to generate the noise-cancellation input test signal $\hat{S}_{test}$. In another exemplary aspect, the noise-reduction circuit 220 may subtract the noise signature $N_{sig}$ from the input ultrasonic test signal $S_{test}$ to generate the noise-cancellation input test signal $\hat{S}_{test}$. In any event, the noise-reduction circuit 220 provides the noise-cancellation input test signal $\hat{S}_{test}$ to the processing circuit(s) 210 for application by the test probe 230 to the test object 154. By pre-processing the input ultrasonic test signal, the noise-reduction ultrasonic test system 200 pre-cancels the noise, resulting in a noise-reduced output waveform.

Figure 6:
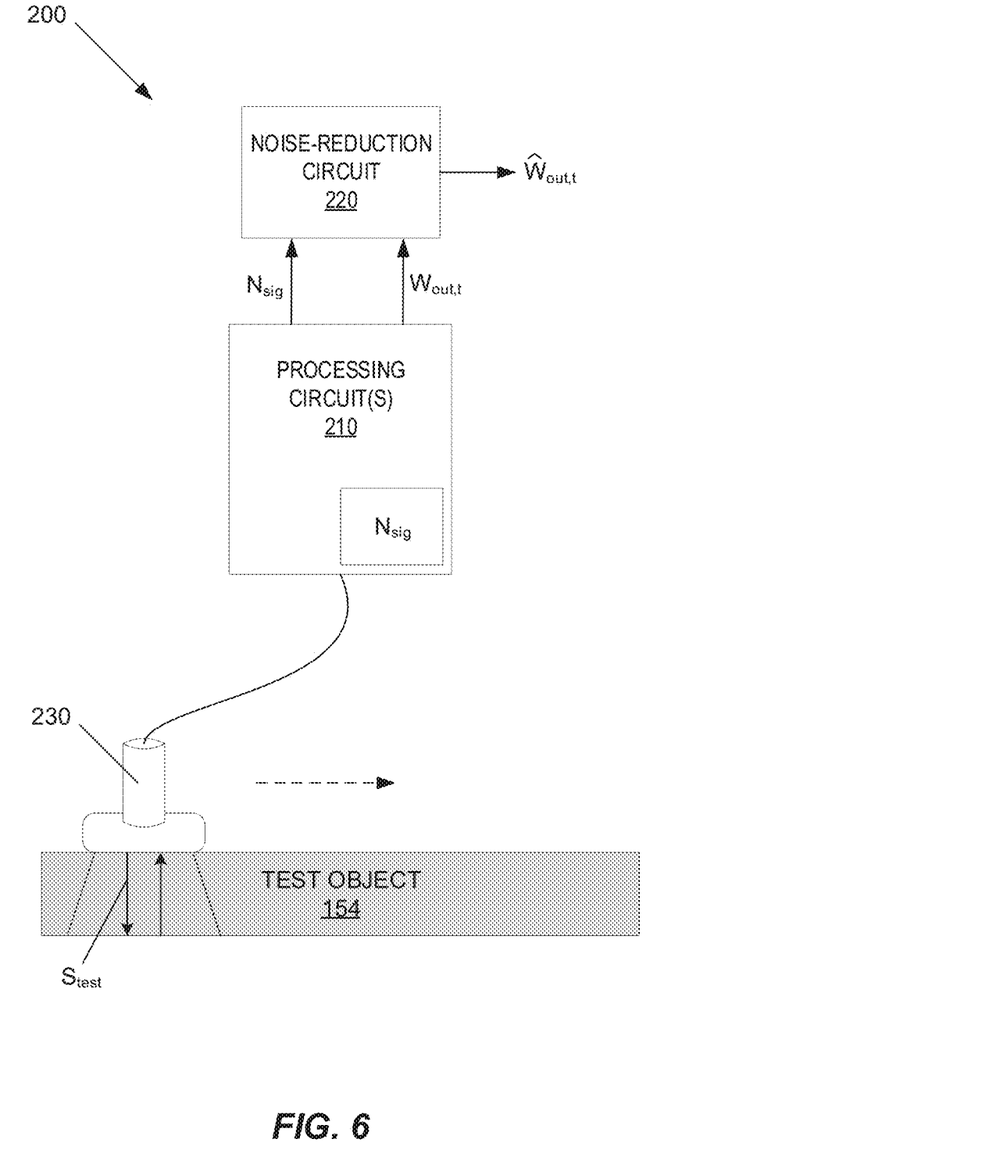
FIG. 6 shows a block diagram of an ultrasonic test system according to further exemplary aspects disclosed herein.

FIG. 6 shows an exemplary block diagram of the noise-reduction ultrasonic test system 200 when post-processing noise-cancellation (block 324) is used to reduce the noise present in the output waveform $W_{out,t}$ for each test object 154. In this exemplary aspect, the processing circuit(s) 210 provide the noise signature $N_{sig}$ and the output waveform $W_{out,t}$ to the noise-reduction circuit 220. The noise-reduction circuit 220 cancels the noise signature $N_{sig}$ from the output waveform $W_{out,t}$ to generate a noise-cancellation output waveform $\hat{W}_{out,t}$. For example, the noise-reduction circuit 220 may multiply the output waveform $W_{out,t}$ by the inverse of the noise signature $N_{sig}$ to generate the noise-cancellation output waveform $\hat{W}_{out,t}$. In another exemplary aspect, the noise-reduction circuit 220 may subtract the noise signature $N_{sig}$ from the output waveform $W_{out,t}$ to generate the noise-cancellation output waveform $\hat{W}_{out,t}$. In any event, the noise-reduction circuit 220 outputs the noise-cancellation output waveform $\hat{W}_{out,t}$. By post-processing the output waveform $W_{out,t}$, the noise-reduction ultrasonic test system 200 cancels noise from the output waveform $W_{out,t}$, resulting in a noise-reduced output waveform $\hat{W}_{out,t}$.

The qualification of the noise-reduction ultrasonic test system 200 may be repeated as often as needed to qualify the noise-reduction ultrasonic test system 200 and/or to obtain a noise signature $N_{sig}$. For example, the noise-reduction ultrasonic test system 200 may go through qualification each time the test objects 154 (and thus the known object 152) change so that the noise-reduction ultrasonic test system 200 may obtain the noise signature $N_{sig}$ that accounts for the new test objects 154. Alternatively or additionally, the noise-reduction ultrasonic test system 200 may go through qualification each time the test environment changes so that the noise-reduction ultrasonic test system 200 may obtain the noise signature $N_{sig}$ that accounts for the new environment. Alternatively or additionally, the noise-reduction ultrasonic test system 200 may go through qualification periodically according to a predetermined qualification schedule, e.g., daily, weekly, monthly, etc. Each time the noise-reduction ultrasonic test system 200 goes through qualification, the noise-reduction ultrasonic test system 200 may obtain a new noise signature $N_{sig}$ for the known object 152 that may be used to reduce the noise for noise-reduction ultrasonic testing performed on the test objects 154.

Alternatively or additionally, the noise-reduction ultrasonic test system 200 may be operable to keep and use previously obtained noise signatures $N_{sig}$ unless there is a change in the environment and/or the test objects 154. In some aspects, the noise signature $N_{sig}$ may be obtained from multiple qualification runs, e.g., where the noise signature $N_{sig}$ used for the corresponding test objects 154 is the average of the noise signatures obtained for the multiple qualification runs. For example, the processing circuit(s) 210 may obtain the noise signature $N_{sig}$ each time the noise-reduction ultrasonic test system 200 passes qualification for a particular known object 152 and a particular environment and store the obtained noise signature $N_{sig}$ in memory. The processing circuit(s) then may be operable to select one of the stored noise signatures $N_{sig}$, e.g., the most recent noise signature, to reduce the noise from the ultrasonic tests on the test objects 154, or may obtain the noise signature by averaging two or more previously obtained noise signatures. For example, the processing circuit(s) 210 may obtain the noise signature from an average of multiple noise signatures, e.g., an average of the n most recently obtained noise signatures, an average of all previously obtained noise signatures, an average of the n noise signatures obtained during a particular qualification test, an average of all noise signatures obtained over a period of time, etc. Alternatively, the processing circuit(s) 210 may obtain the noise signature from an average of multiple qualification waveform outputs, e.g., an average of the n most recently obtained qualification output waveforms, an average of all previously obtained qualification output waveforms, an average of the n qualification output waveforms obtained during a particular qualification test, an average of all qualification output waveforms obtained over a period of time, etc.

The noise-reduction ultrasonic test system 200 disclosed herein may improve ultrasonic testing for any test object 154, where a corresponding known object 152 having the same material composition and the same dimensions as the test objects 154 is used for qualification of the noise-reduction ultrasonic test system 200. Exemplary test objects 154 include, but are not limited to, production parts for an assembled structure, e.g., airplane, boat, or car, and/or assembled sections of a structure, e.g., airplane, boat, or car. In some aspects, the test object 154 may have the same geometry as the known object 152, e.g., the same dimensions as well as the same shape, edge characteristics, corner characteristics, etc. In other words, in some aspects the known object 152 is identical to the test objects 154 except for the known defects/flaws embedded in the known object 152.

Figure 7:
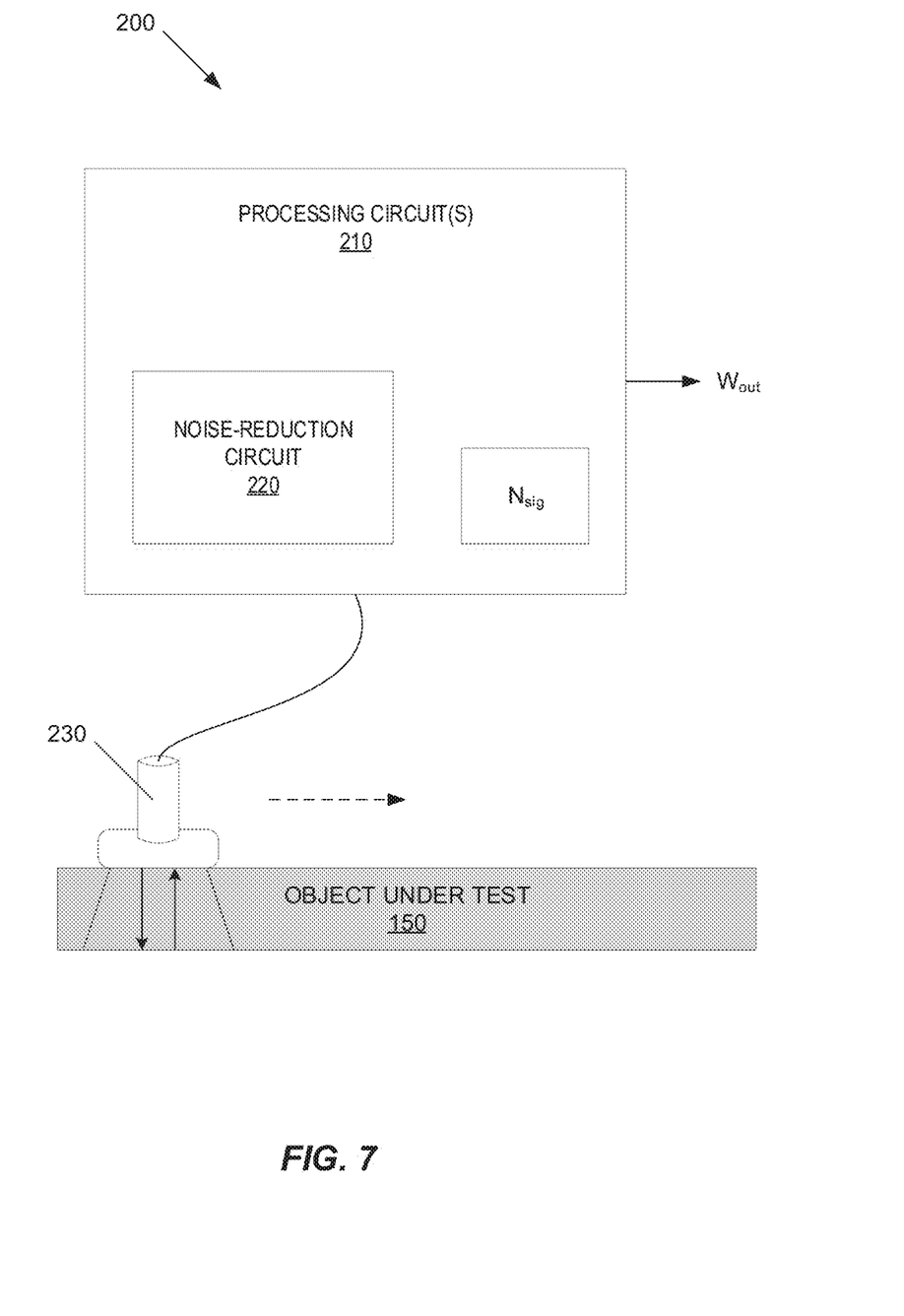
FIG. 7 shows a block diagram of an ultrasonic test system according to further exemplary aspects disclosed herein.

Aspects disclosed herein present the noise-reduction ultrasonic test system 200 in terms of a noise-reduction circuit 220 separate from the processing circuit(s) 210. It will be appreciated, however, that the noise-reduction circuit 220 may be part of the one or more processing circuits 210, as shown in FIG. 7.

Aspects disclosed herein determine the noise for a particular material in a particular environment, and then use the determined noise to reduce the noise impact on ultrasonic tests performed on objects made from the same material in the same environment. As such, aspects disclosed herein improve the signal-to-noise ratio, and thus improve the accuracy of the ultrasonic tests. The accuracy improvement provided by aspects disclosed herein reduces the number of rejected parts, decreases the ultrasonic inspection time (by reducing the uncertainty in some results), and reduces the likelihood of human error. Further, the aspects disclosed herein do not add any complexity or cost to the current ultrasonic test procedures. In addition, unlike filtering noise-reduction techniques, the aspects disclosed herein do not reduce the signal level or require iterative procedures to determine the optimum parameters, e.g., for the optimum filter. Thus, aspects disclosed herein reduce costs, e.g., production and/or testing costs.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

What is claimed is:

1. A method of improving an accuracy of ultrasonic tests applied by an ultrasonic test system to test production parts of a structure, each test production part having same material composition and same dimensions, the method comprising:
   obtaining a noise signature for a first ultrasonic test applied by the ultrasonic test system to a known object having the same dimensions and the same material composition as the test production parts with the known object having one or more known defects; and
   reducing noise in an output of a second ultrasonic test applied by the ultrasonic test system to one or more of the test production parts responsive to the noise signature to improve the accuracy of the second ultrasonic test.

2. The method of claim 1 wherein said obtaining the noise signature comprises:
   performing a qualification test on the known object using the ultrasonic test system to generate a qualification output waveform, wherein said qualification test has an expected output waveform for the known object; and
   obtaining the noise signature by extracting the noise signature from the qualification output waveform using the expected output waveform.

3. The method of claim 2 wherein:
   said performing the qualification test on the known object comprises:
      performing multiple qualification tests on the known object using the ultrasonic test system to generate the qualification output waveform for each of the multiple qualification tests; and
      averaging two or more of the qualification output waveforms to generate an average qualification output waveform; and
   said extracting the noise signature comprises extracting the noise signature from the average qualification output waveform using the expected output waveform.

4. The method of claim 2 wherein:
   said performing the qualification test on the known object comprises performing multiple qualification tests on the known object using the ultrasonic test system to generate the qualification output waveform for each of the multiple qualification tests; and
   said extracting the noise signature comprises:
      extracting a preliminary noise signature from each of two or more of the qualification output waveforms using the expected output waveform; and
      averaging the preliminary noise signatures to generate the noise signature.

5. The method of claim 1 wherein said reducing the noise comprises pre-processing an input test signal for the ultrasonic test system to generate a noise-cancellation input test signal for application by the ultrasonic test system to one or more of the test production parts.

6. The method of claim 5 wherein said pre-processing the input test signal comprises applying a reciprocal of the noise signature to the input test signal to generate the noise-cancellation input test signal.

7. The method of claim 5 wherein said pre-processing the input test signal comprises subtracting the noise signature from the input test signal to generate the noise-cancellation input test signal.

8. The method of claim 1 wherein said reducing the noise comprises post-processing a test output waveform output by the ultrasonic test system for a corresponding one of the test production parts using the noise signature to generate a noise-reduced output waveform for the corresponding one of the test production parts.

9. The method of claim 8 wherein said post-processing the test output waveform comprises applying a reciprocal of the noise signature to the test output waveform to generate the noise-reduced output waveform.

10. The method of claim 8 wherein said post-processing the test output waveform comprises subtracting the noise signature from the test output waveform to generate the noise-reduced output waveform.

11. An ultrasonic test system operable to improve an accuracy of ultrasonic tests applied by the ultrasonic test system to one or more test production parts of a structure, each test production part having same material composition and same dimensions, the ultrasonic test system comprising:
one or more processing circuits operable to obtain a noise signature for a first ultrasonic test applied by the ultrasonic test system to a known object having the same dimensions and the same material composition as the test production parts with the known object being different than the test production parts; and
a noise-reduction circuit operable to reduce noise in an output of a second ultrasonic test applied by the ultrasonic test system to one or more of the test production parts responsive to the noise signature to improve the accuracy of the second ultrasonic test.

12. The ultrasonic test system of claim 11 wherein the one or more processing circuits obtain the noise signature by:
performing a qualification test on the known object using the ultrasonic test system to generate a qualification output waveform, wherein said qualification test has an expected output waveform for the known object; and
obtaining the noise signature by extracting the noise signature from the qualification output waveform using the expected output waveform.

13. The ultrasonic test system of claim 12 wherein the one or more processing circuits:
perform the qualification test on the known object by:
performing multiple qualification tests on the known object using the ultrasonic test system to generate the qualification output waveform for each of the multiple qualification tests; and
averaging two or more of the qualification output waveforms to generate an average qualification output waveform; and
obtain the noise signature by extracting the noise signature from the average qualification output waveform using the expected output waveform.

14. The ultrasonic test system of claim 12 wherein the one or more processing circuits:
perform the qualification test on the known object by:
performing multiple qualification tests on the known object using the ultrasonic test system to generate the qualification output waveform for each of the multiple qualification tests; and
obtaining the noise signature by:
extracting a preliminary noise signature from each of two or more of the qualification output waveforms using the expected output waveform; and
averaging the preliminary noise signatures to generate the noise signature.

15. The ultrasonic test system of claim 11 wherein the noise-reduction circuit reduces the noise by pre-processing an input test signal for the ultrasonic test system to generate a noise-cancellation input test signal for application by the ultrasonic test system to one or more of the test production parts.

16. The ultrasonic test system of claim 15 wherein the noise-reduction circuit pre-processes the input test signal by applying a reciprocal of the noise signature to the input test signal to generate the noise-cancellation input test signal.

17. The ultrasonic test system of claim 15 wherein the noise-reduction circuit pre-processes the input test signal by subtracting the noise signature from the input test signal to generate the noise-cancellation input test signal.

18. The ultrasonic test system of claim 11 wherein the noise-reduction circuit reduces the noise by post-processing a test output waveform output by the ultrasonic test system for a corresponding one of the test production parts using the noise signature to generate a noise-reduced output signal for the corresponding one of the test production parts.

19. The ultrasonic test system of claim 18 wherein the noise-reduction circuit post-processes the test output waveform by applying a reciprocal of the noise signature to the test output waveform to generate the noise-reduced output signal.

20. The ultrasonic test system of claim 18 wherein the noise-reduction circuit post-processes the test output waveform by subtracting the noise signature from the test output waveform to generate the noise-reduced output signal.

* * * * *